Jan. 30, 1940. O. H. BORGESON 2,188,805
SNOW PLOW
Filed Feb. 15, 1939
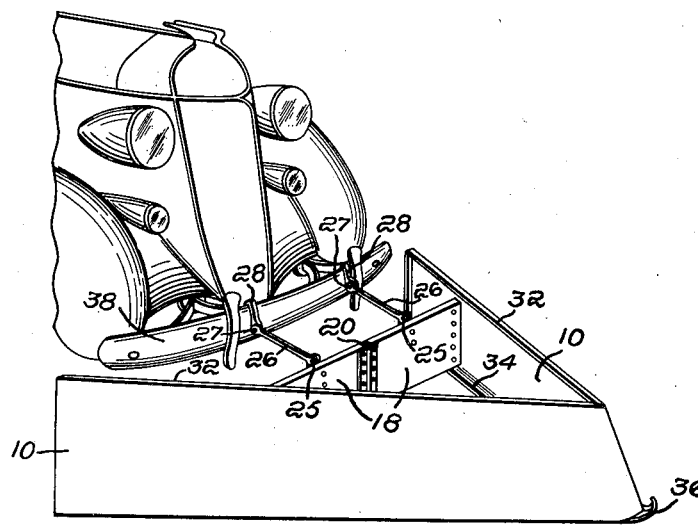
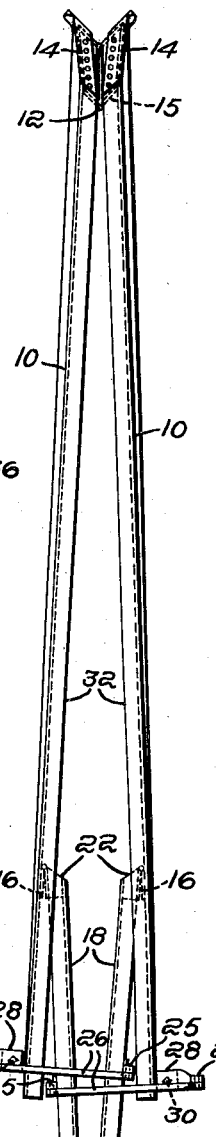
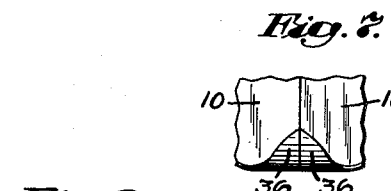
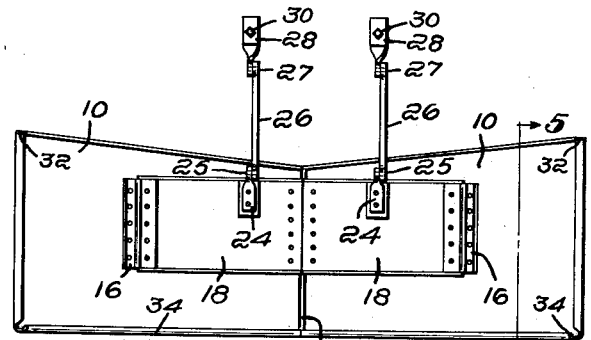
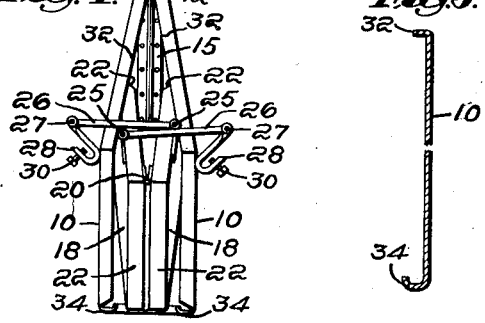
Inventor:
Olaf H. Borgeson,
by Kenway & Witter
Attorneys Patented Jan. 30, 1940

2,188,805

UNITED STATES PATENT OFFICE 2,188,805

SNOW PLOW

Olaf H. Borgeson, Wellesley Hills, Mass.

Application February 15, 1939, Serial No. 256,434

6 Claims. (Cl. 37—44)

This invention relates to snow plows and more particularly to a novel folding snow plow which in open position can be conveniently attached to and driven by an automobile and which, when not in use, can be folded to relatively small capacity for its convenient transportation and storage. My novel snow plow is more particularly adapted for private use on small estates and the like where the roads and paths to be cleaned are not of sufficient extent to warrant the expenditure necessary for a power driven plow but which are too extensive to be shoveled manually. My improved plow is of simple construction employing two pivotally connected mold boards and suitable bracing means therefor all arranged and combined to permit quick and easy opening and closing of the plow to operative position and/or closed and folded position wherein it can be stored conveniently or easily transported either manually or by use of a small vehicle. The production of such an improved and lightly but substantially constructed snow plow adapted conveniently to serve these functions comprises one object of the invention.

Another feature of the invention is the employment of attaching means carried by the plow and including jaws for connecting the plow to either the forward or rear bumpers of an automobile in such manner that the plow rests by gravity on the ground and serves its function by being pushed forwardly through the snow by the vehicle, it being clear that all automobiles have such bumpers which are constructed to take a considerable thrust load. Further features of the invention reside in constructing the plow, or portions thereof, of sheet steel and so rounding the bottom edges of the mold boards and so shaping the nose ends of the boards that the apparatus will plow its way through the snow and over the ground surface without disturbing or injuring grass, gravel, or other material at such surface.

These and other features of the invention will be best understood and appreciated from the following description of a preferred embodiment thereof selected for purposes of illustration and shown in the accompanying drawing in which:

Fig. 1 is a perspective view of my improved snow plow in operative position and attached to the forward end of an automobile, Fig. 2 is a rear view of the plow in open position, Fig. 3 is a plan view of the plow in closed or folded position, Fig. 4 is a rear perspective view of the plow in collapsed position, Fig. 5 is a sectional view through a mold board on line 5—5 of Fig. 2, Fig. 6 is a fragmentary plan view showing the nose of the plow, and Fig. 7 is a fragmentary front view thereof.

Referring more particularly to the drawing by reference characters, 10 indicates two mold boards pivoted together at their forward ends for opening and closing movement on an axis 12 extending upwardly and slightly pitched rearwardly of the plow. This axis is located rearwardly of but adjacent to the edges 14 at the forward ends of the boards and these edges are of such angular relation as to cooperate to provide a closed V-point for the plow when the boards are in the open position shown in Figs. 1 and 2. This pivotal connection can be conveniently made by using the hinge joint shown in Fig. 3 wherein the hinge plates 15 are attached to the edges 14 in a position leaving the hinge pintle 12 rearwardly of such edges.

The mold boards are adapted to be held in the open position by suitable bracing means between and attached to the boards at 16 adjacent to their rear ends and including connections permitting the boards to be moved about the pivot axis 12 to said open and closed positions illustrated in the drawing. This bracing means, as illustrated in the drawing, comprises two braces or brace elements 18 having their inner ends pivotally connected together at 20 and having their outer ends pivoted to the boards at 16. The hinges illustrated serve conveniently to provide these connections and it will be noted that the hinges are so arranged as to permit the braces to fold rearwardly from the position of Fig. 1 to the position of Fig. 3, and shoulders 22 are provided for limiting forward movement of the braces substantially to the position shown in Fig. 1 in which position the mold boards are spread to their maximum open relation.

The rearward pitch given to the nose of the plow aids the plow to ease through drifts or hard snow and remain beneath the snow, whereas a plow with a vertical nose would directly abut the snow and tend to lift up and ride thereover. The rearward pitch given to the front pivot 12 also serves the useful function of causing the pivot joints to bind into tight relation when the plow is opened from its collapsed position, it being apparent that this action is due to the fact that the pivot 12 is out of parallel with the vertical pivots at 16 and 20. The plow is so constructed that the pivot pin 12 can be inserted when the plow is in collapsed position, opening of the plow from that position causing a twisting or warping of the resilient sheet mold boards 10 which results in placing the several hinge joints under a tightening strain.

The plow is constructed to be pushed through the snow and one feature of the invention resides in providing convenient means for attaching the plow to an automobile which is to serve as the pushing power. Since all automobiles are provided with bumpers, I preferably employ attaching arms on the plow arranged and constructed with jaws for convenient attachment to such bumpers. Each of two such arms illustrated in the drawing comprises a plate 24 bolted to a brace 18 and having pivotally connected thereto at 25 a link 26 to the free end of which is pivoted at 27 a jaw 28. The jaw is adapted to engage over the bumper and be secured thereto by a set screw 30.

The mold boards 10 are preferably constructed of sheet steel and the braces 18 may be likewise constructed or may be made of wood or any suitable material. As illustrated, each mold board comprises a sheet of steel having the edges thereof, as at 32, bent laterally rearwardly to form board edges of substantial thickness. The bottom edges 34 of the boards are bent U-shaped to provide each board with a rounded edge for resting on the ground and the front ends 36 of the bottom edges are bent upwardly and shaped to provide a single upwardly forwardly extending nose for the plow when the boards are in the diverging and plowing relation shown in Fig. 1.

The construction and operation of the plow are now believed to be obvious. When not in use, the plow may be folded to the collapsed condition shown in Fig. 3 in which the braces 18 are folded together rearwardly and the mold boards 10 are brought to a near parallel relation. The arms 26—28 are also folded inwardly over the boards and braces whereby placing the entire plow in a compact condition in which it can be conveniently handled and stored.

When the plow is to be used the mold boards and braces are spread to the position of Fig. 1 and the jaws 28 are attached to the bumper 38 of an automobile. In such position the plow rests freely on the ground and can be pushed along ahead of the vehicle. The horizontal pivots 25 and 27 permit the plow to remain flatly on the ground independently of the vehicle and, as it is pushed along, the upwardly extending nose 36 and the rounded bottom edges 34 ride over the ground without digging up or disturbing the grass, gravel, or other material on the ground surface. It may be noted that the plow can be attached to the rear bumper of the vehicle to plow out the driveway as the vehicle is backed from the garage. It will now be apparent that I have produced a light-weight and very substantial snow plow for private use which can not only be conveniently attached to and used in connection with any automobile but which can also be readily collapsed into such small capacity that it may be conveniently stored when not in use.

Having thus described my invention what I claim as new and desire to secure by Letters Patent of the United States is:

1. A folding snow plow comprising a pair of resilient sheet metal mold boards pivoted together at their forward ends on an axis slanting upwardly-rearwardly from the vertical, braces between and attached to the boards adjacent to their rear ends and including substantially vertical hinge joints connecting the braces to the boards and to each other, said hinge joints permitting the boards to be moved about the pivot axis to open and closed positions wherein the boards are in substantial diverging relation and near parallel relation respectively and the non-parallel axes of the pivot and hinge connections being adapted to cause such connections to bind into a tightening relation when the mold boards are brought to open position, and means for attaching the plow to a vehicle rearwardly thereof.

2. A folding snow plow comprising a pair of mold boards pivoted together at their forward ends, a pair of braces between the boards, the inner ends of the braces being pivoted together and their outer ends being pivoted to the boards adjacent to their rear ends, the pivotal connections permitting the braces to fold rearwardly and the boards to collapse toward each other from their open and operative position and including shoulders preventing folding of the braces forwardly from a relation holding the boards in said open position, and arms carried by the braces and adapted to be connected to a vehicle rearwardly thereof.

3. The snow plow defined in claim 2 wherein said arms include pivot joints having horizontal axes and jaws at the free ends of the arms for attachment to the bumper of an automobile.

4. A folding snow plow comprising a pair of mold boards pivoted together at their forward ends, braces between and attached to the boards adjacent to their rear ends and including hinge joints connecting the braces to the boards and to each other whereby permitting the boards to be opened about the pivot axis to diverging relation and to be closed about said axis to a near parallel relation, the bottom edges of the boards being of sheet metal bent U-shaped to provide each board with a rounded edge for resting on the ground and the front ends of the bottom edges being bent upwardly and shaped to provide a single upwardly-forwardly extending nose for the plow when the boards are in said diverging relation, and means jointed on horizontal axes and carried by the plow for attachment to the bumper of an automobile whereby to push the plow forwardly while permitting it to rest of its own weight on the ground.

5. A folding snow plow comprising a pair of mold boards, each board comprising a sheet of metal having the edges thereof bent laterally-rearwardly to form board edges of substantial thickness, means connecting the boards together at their forward ends for relative pivotal movement on an axis extending upwardly along and rearwardly of but adjacent to the edges at the forward ends of the boards, braces between and attached to the boards adjacent to their rear ends and including hinge joints connecting the braces to the boards and to each other whereby permitting the boards to be opened about said axis to diverging relation and to be closed about said axis to a near parallel relation, said edges at the forward ends of the boards being of such angular relation as to cooperate to provide a closed V-point for the plow when the boards are in said open position, and jointed means for attaching the plow to the bumper of an automobile whereby to push the plow forwardly while permitting it to rest by gravity on the ground.

6. A folding snow plow comprising a pair of mold boards connected together at their forward ends for relative pivotal movement on an axis extending upwardly along and rearwardly of and adjacent to the edge surfaces at the forward ends of the boards, two braces hinged together at their inner ends and hinged at their outer ends to the mold boards adjacent to their rear ends, such hinge joints permitting the boards to be moved about the pivot axis to open and closed positions wherein the boards are in substantial diverging relation and near parallel relation respectively, said edge surfaces at the forward ends of the boards being in such angular relation as to come into contact and provide a closed V-point for the plow when the boards are in said open position, and means for attaching the plow to a vehicle rearwardly thereof.

OLAF H. BORGESON.